May 26, 1936.   W. L. GORDON ET AL   2,041,704
STEERING HANDLE
Filed Feb. 5, 1934   2 Sheets-Sheet 1
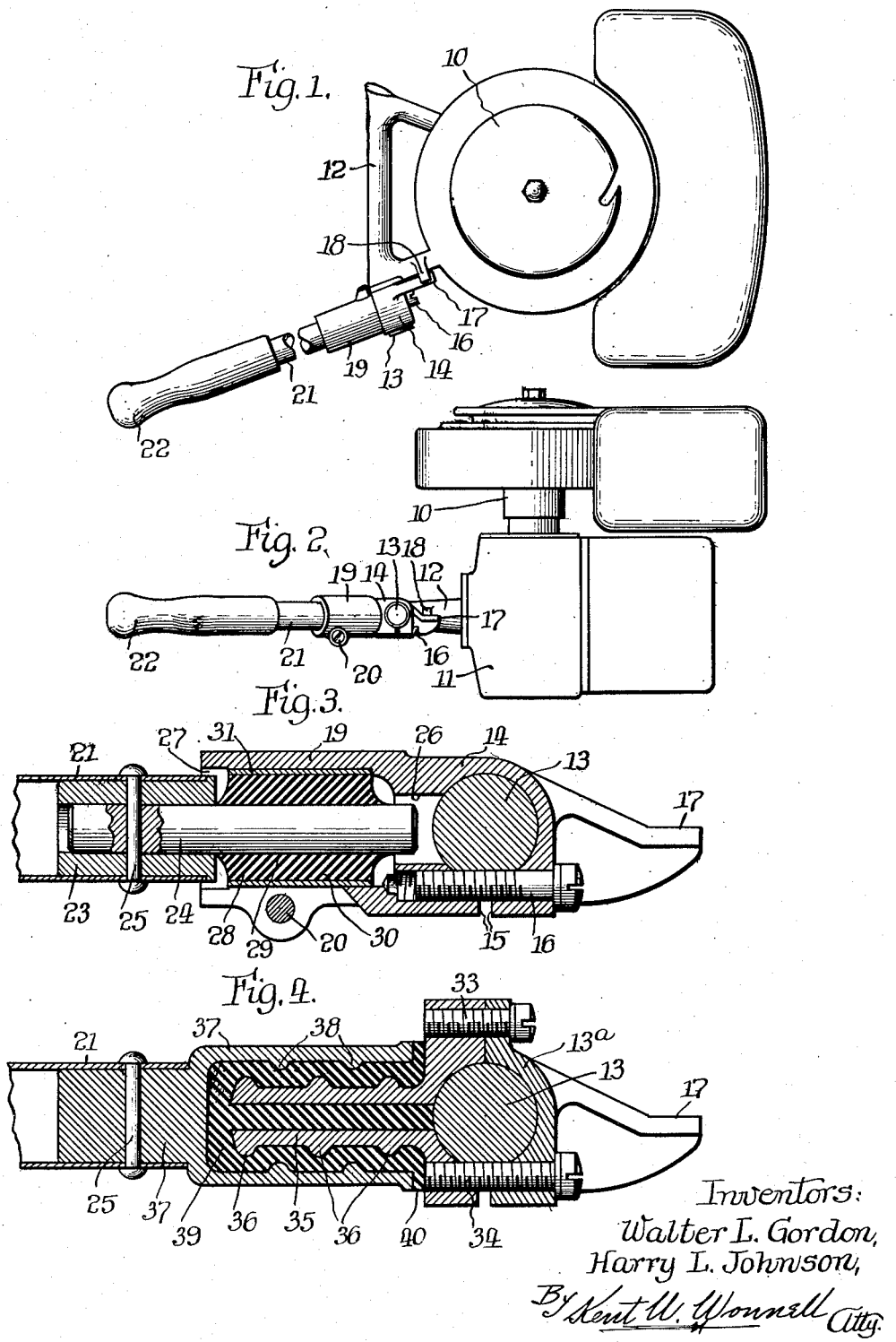
Inventors:
Walter L. Gordon,
Harry L. Johnson,

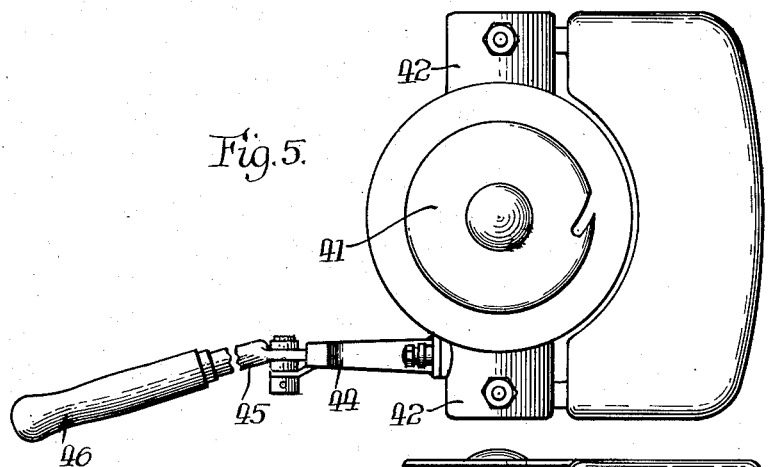
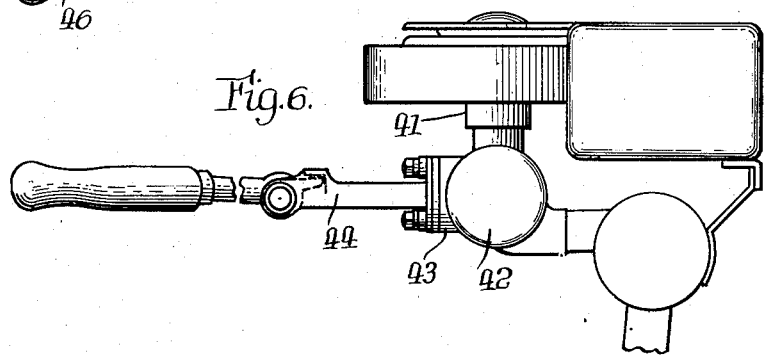
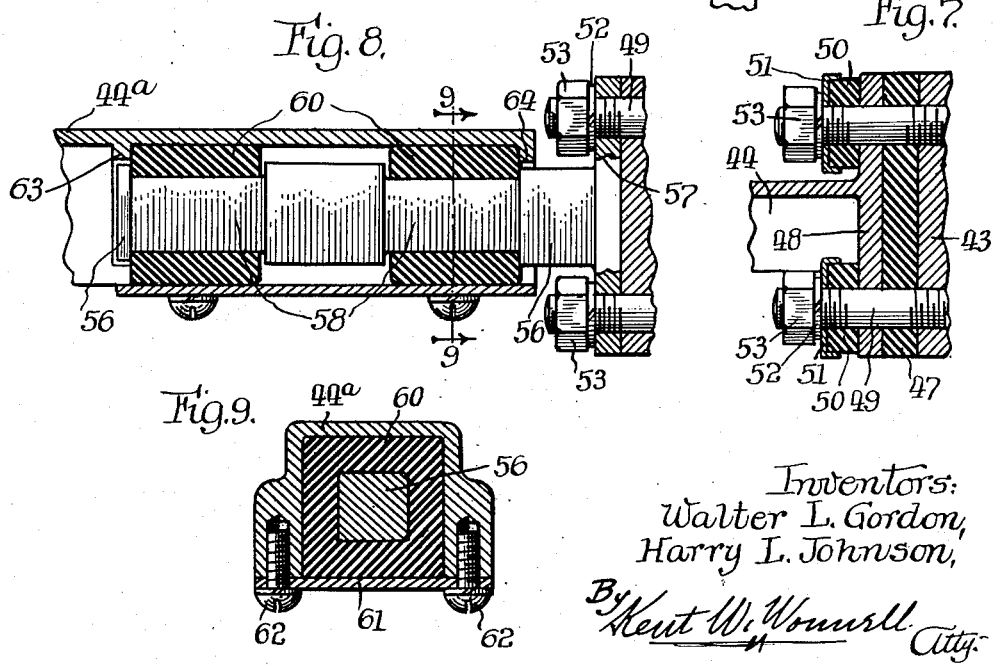

Patented May 26, 1936

2,041,704

UNITED STATES PATENT OFFICE 2,041,704

STEERING HANDLE

Walter L. Gordon and Harry L. Johnson, Waukegan, Ill., assignors to Johnson Brothers Engineering Corporation, Waukegan, Ill., a corporation of Illinois Application February 5, 1934, Serial No. 709,689

2 Claims. (Cl. 115—18)

This invention relates in general to a cushioned steering handle which may be used wherever applicable but it is particularly designed and intended for use as a steering handle for outboard motors.

A principal object of the invention is to provide a cushioned steering handle in which the motor vibration transmitted thereby to the hand of an operator is materially reduced or lessened.

A further object of the invention is in the provision of a cushion steering handle which has a positively engaging limit stop to prevent undue distortion of the cushioning material.

A still further object of the invention is in the provision of handle parts and a cushioning material such as rubber vulcanized thereto and separating the other parts during normal operation of the handle.

Other objects of the invention will appear hereinafter, the preferred constructions being illustrated in the accompanying drawings.

In the drawings, Figs. 1 and 2 are top and side views respectively of a portion of an outboard motor to which a steering handle embodying this invention is applied;

Fig. 3 is a sectional view of the steering handle proper and its connection to the motor;

Fig. 4 is a sectional view of a handle modification;

Figs. 5 and 6 are top and side views respectively of a different form of handle and mounting bracket as applied to an outboard motor;

Fig. 7 is a sectional detail of the connection of the mounting bracket;

Fig. 8 is another form of rubber mounting for the steering handle; and

Fig. 9 is a section taken on the line 9—9 of Fig. 8.

The usual metal steering handle of an outboard motor extends at an angle away from the motor itself and even a slight vibration of the motor when transmitted to the end of the handle is considerably magnified so that the vibration is quite objectionable and becomes very annoying to the operator. Even if the grip of the handle is made of rubber or is flexible the extreme end of the steering handle may have a considerable shaking movement due to the engine vibration.

The present invention relates to a rubber insert within the handle or in a mounting bracket for the handle with metal vulcanized or secured thereto and so disposed that they will engage to limit the distortion of the rubber but will take up the ordinary vibration which is otherwise so objectionable.

A vulcanized insert has a distinct advantage over a plain rubber sleeve for some flexibility of mounting can be obtained with considerable less shaking of the steering handle grip. With a plain rubber sleeve the rubber must be of considerably harder grade for an equal amount of steering handle shake at the extreme end.

Referring now more particularly to the drawings, an outboard motor 10 of any usual or well known form has a casing part 11 from which a steering rail 12 extends. This rail usually has a handle stud 13 projecting at an angle from the rail and from the motor to which a handle is pivoted.

One form of handle comprises a bearing member 14 having a portion fitting around the stud 13 and adapted to be more or less tightly mounted thereon by means of a split 15 at one side of the member tightened by a screw 16. Extending at one side of the bearing member 14 is a projection forming an abutment 17 for engaging a corresponding projection 18 extending from the steering rail 12 in the path of the abutment 17 and limiting the movement of the member 14 in one direction. Extending from the opposite side of the bearing member is a split socket 19 having a clamping screw 20 for tightening the split portions in a well known manner.

A handle member 21 has a grip 22 at its outer end and if tubular in form as shown, it has a short sleeve 23 at its inner end for tightly receiving one end of a bar 24 therein, the sleeve and bar being held tightly in place at this end of the handle by means of a rivet 25 passing through all of them, or other suitable fastening means. The free end of this bar 24 extends through the socket 19 of the bearing member 14 and into a portion 26 of reduced diameter being slightly larger than the end of the bar 25 to allow a limited movement of the bar therein. The inner end of the handle member and the sleeve 23 also project within the outer edge of the sleeve member 19 leaving a space 27 between them.

In order to connect the handle and the bearing member, a connecting sleeve 28 of soft rubber is vulcanized at the inside 29 to the outer surface of the bar 24 and the outer surface of the rubber sleeve is vulcanized at 30 to the inside of a metal shell 31 which is of a size to fit closely within the socket 19 of the bearing member and to be tightened therein by the screw 20.

With this construction the ordinary vibration of the engine is taken up by the interposed and vulcanized rubber sleeve 28 and if it is desired to turn or move the handle with respect to the motor, any considerable movement which would tend to distort the rubber sleeve 28 is limited by the engagement of the handle 21 with the socket 19 or the engagement of the end of the bar 24 with the reduced inner portion 26 of the socket. Thus the handle tends to turn about an axis within the rubber sleeve itself when making an operative movement of the handle with respect to the mounting member 14, but only to the extent as permitted by the looseness of the handle in the socket portion 19, the only ordinary and objectionable vibrations of the motor being taken up almost entirely by the rubber sleeve 28.

In the form shown in Fig. 4 the socket member 13a has split parts connected by screws 33 and 34, one of the parts including a hollow stem 35 with ridges or projections 36 at intervals therealong, and the handle member 21 has a socket member 37 which extends loosely over the stem and with ridges or projections 38 therein disposed between the ridges or projections 36 of the stem, and the socket and the stem being suitably spaced about to receive therebetween a vibration absorbing mass of rubber 39 outside of a stem 39 and to the inside of the socket 37 with a flange 40 of rubber between the end of the socket and the adjacent portion of the stem 35 and with a rubber portion inside the stem 35 extending to contact with the stud 13 and thereby to produce a damping effect upon the relative turning movement. With this construction there is no contact of metal to metal between the handle and the socket member, the vibration is taken up by the vulcanized rubber and the rubber being confined within the socket 37 will permit a considerable relative movement of the handle and bearing member before the bearing member is positively turned by the handle.

In the form shown by Figs. 5 and 6, an outboard motor 41 has an engine or casing part 42 with a handle attaching projection 43 thereon preferably at one side of the motor. To this projection is secured a handle bracket 44 and a handle 45 hinged at the outer end of the bracket has a grip 46 for moving it to steer the motor.

In order to reduce the vibration of this type of handle, a block of resilient rubber 47 is interposed between the projection 43 and an inner flange 48 of the handle bracket 44 through which extend attaching bolts 49. At the outer sides of the flange 48 small rubber blocks 50 are inserted upon the bolts and over them are placed metallic confining cups 51. A split washer 52 and a fastening nut 53 is then applied to the outer end of each bolt 49 and the whole assembly is drawn tightly in place, the metallic cups preventing excessive distortion of the rubber washers or blocks 50 and in effect confining the handle bracket 44 between the resilient blocks 43 and 50, thus materially reducing any vibration which may be transmitted to the handle at the outer end of the bracket.

Instead of providing the mounting directly adjacent the engine as shown in Fig. 7, the handle bracket may comprise a construction as shown in Figs. 8 and 9, in which the bracket member 44a is hollow for receiving a stem 56 which has an outer flange 57 engaged by bolts 49 and fastening nuts 53. The stem has reduced portions 58 for receiving sleeves 60 of resilient material such as soft rubber, which are preferably vulcanized thereto and confined within the handle member 44a by means of a plate 61 attached as shown in Fig. 9 by fastening screws 62 for holding the sleeves 60 tightly in place in the handle and confined along the stem by the enlarged portions at the ends of the reduced portions 48. At the inner end of the stem 56 is a projection 63 and at the outer end is a projection 64 from the handle member 44a which terminates a short distance from the stem 56 in its normal position and free of contact therefrom so that between the handle member 44a and the stem 56 there is no actual contact except when the rubber sleeves 60 are compressed to their limiting position, thereby providing a construction which decreases vibration and provides a handle mounting similar in effect to the others herein described.

We claim:

1. In a shock absorbing device, a stem and a socket in which the stem extends, a stud upon which the stem is pivoted, the stem having an opening extending from between the stem and socket to the stud, and a rubber cushion between the stem and socket extending also in the opening of the stem to the stud to produce a damping effect upon the turning movement thereon.

2. A structure in accordance with claim 1 in which the inside of the socket and the outside of the stem have staggered projections to receive the rubber cushion which absorbs vibration therebetween.

WALTER L. GORDON.
HARRY L. JOHNSON.